3,592,667
CEREAL SLURRY DRYING
Vincent J. Kelly and William G. Fry, Fremont, Mich., assignors to Gerber Products Company, Fremont, Mich.
Filed June 3, 1968, Ser. No. 733,842
Int. Cl. A23b 7/02, 9/00
U.S. Cl. 99—199                                         3 Claims

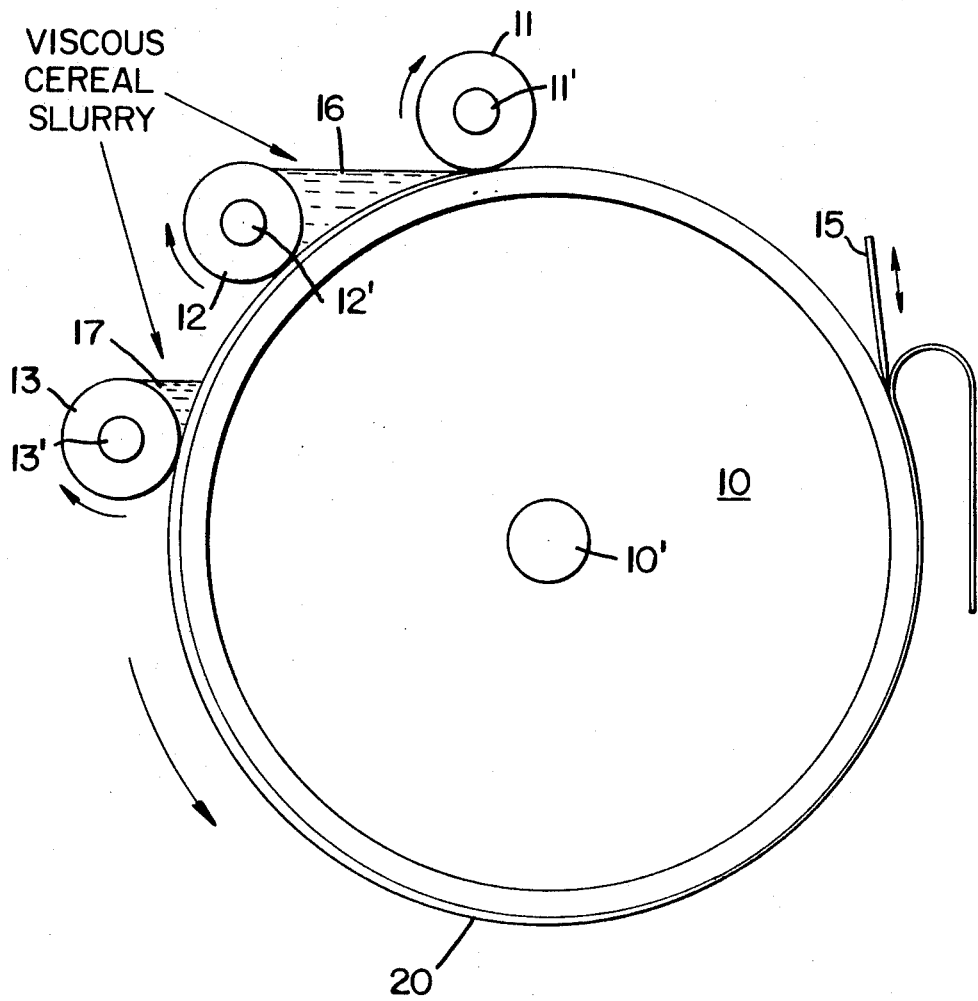

ABSTRACT OF THE DISCLOSURE

A process for preparing a continuous, uniform dried cereal sheet from a viscous cereal slurry by utilizing a series of rotatably-driven applicator rolls to distribute a corresponding number of incremental layers of slurry into intimate contact with the surface of a rotatably-driven drum drier at spaced-apart locations along a quadrant of the drier. The rolls are arranged along an upper quadrant of the drier surface so that at least one trough is provided for retention of slurry in contact with the drier surface and an applicator roll.

---

This invention is directed to the drying of a cereal slurry, and, more particularly, to the employment of a plurality of peripherally spaced-apart applicator rolls as a means for distributing overlapping layers of viscous cereal slurry on the surface of the drum drier while also providing intimate contact between the sheet of slurry and the drying surface.

Drum drying involves the application of a liquid material such as a solution, slurry or paste to a revolving heated metal drum that conducts heat to the wet material during a partial revolution of the drum to reduce the water content thereof by evaporation. The dried material is scraped from the surface of the drum by a stationary knife (doctor blade) spaced around the drum periphery from the point of application an arcuate disance corresponding to that desired to allow for drying. In this manner, the product is exposed to heat during the brief time required for the drum to rotate around this arc between the point of application and the fixed location of the knife.

In the fluid cereal slurry industry, drying is usually accomplished with atmospheric double drum driers, i.e., a pair of closely spaced cylindrical drying surfaces that are heated internally as by steam. Drums are conventionally employed that have the same radius and are in parallel alignment with their axes of rotation on the same level. The cereal slurry to be dried is disposed as a "puddle" or pool in the space (trough) formed between the upper, adjacent surfaces of the two drums. Endboards, faced with a material suitable for enclosing the cereal slurry being dried, are employed to confine the liquid between the drums. The puddle, normally in direct contact with the upper adjacent surfaces of both drums, provides a thin film that is deposited on the drums as they rotate downwardly toward the nip formed between their adjacent outer surfaces. Drying of the film continues throughout the arcuate interval while the sheet is in contact with the heated drum surface prior to being scraped from each drum by respective stationary blades.

Present practice in the cereal drying industry involves the use of a relatively thin cereal slurry, i.e., a slurry having a solid content usually no greater than about 14% by weight. The reason for this is that when the cereal slurry solids content is increased above about 14%, the slurry viscosity also increases proportionally and, as a result, cushions or pockets of steam that form between the layer of slurry and the hot surface of the drum drier, as the aqueous content of the slurry vaporizes, are not released but remain entrapped between the cereal layer and drum surface. For this reason, the film of cereal slurry that is formed on the drier roll is neither continuous nor uniform. The resulting dried end product is found to be lacy and thin, and not reduced to the required bulk density. Furthermore, the lack of continuous contact between the heated drum dried surface and the cereal slurry decreases the efficiency of the heat transfer therebetween. As a result, the anticipated increase in production rate is not produced even though solid content is increased. Thus the cereal industry is presently limited to the treatment of slurries having the aforementioned low solid concentrations.

It has now been found that cereal slurries having high solid contents, i.e., in the range of 20% solids or more (and correspondingly higher viscosities) can be handled on conventional atmospheric drum driers by employing a series of applicator rolls spaced in tangential alignment around a heated quadrant of the peripheral surface of the drum drier. More specifically, the applicator rolls are arranged to apply the cereal slurry to the drying surface from a series of "puddles" formed in the space between the adjacent surface of the drum and a number of rotatably driven applicator rolls. In this manner, the rolls tend to force the slurry coating into repeated contact with the heated surface with the result that a continuous cereal layer is maintained in intimate contact with the heated surface. In operation, the slurry is applied as successive thin layers that combine into a cereal coating that efficiently dries to a highly desirable product that can be readily flaked with a minimum of powder formation.

It has been found to be especially advantageous for the applicator rolls to be driven in a direction opposite to the driven direction of the drier, and at a rate corresponding to the surface speed of the drier. Furthermore, by providing applicator rolls of a length corresponding to about the length of the drying surface and having axes parallel to the axis of the drying surface, drying is optimized.

Present practices in the starch and potato processing industries involve the use of drum driers in combination with one or more smaller diameter rolls that distribute the starch (or potato) slurry on the surface of the drier. However, no attempt is made to produce a continuous uniform sheet as the dried product is ground or in some manner comminuted to the commercial product. In fact, in these industries, both of these types of slurry have been observed to adhere to the surface of the small rolls. As a result, and in order to operate with any degree of efficiency, these industries employ scrapers in conjunction with the rolls to continually remove slurry buildup therefrom. In contrast thereto, the present viscous cereal slurry is readily transferred from the applicator rolls to the drying surface without a continuous buildup on the holls.

Although it is not intended that this invention be limited to any particular theoretical concept, it appears that by applying the slurry as a succession of thin layers to the drum drier surface, the coating retains sufficient porosity to allow for steam escape from the interfacial area between the cereal coating and heated drum surface. Furthermore, by forcing the coating into contact with the heated surface at a series of spaced-apart intervals, rather than only at a single time as at the nip formed between conventional double drum driers, the coating apears to remain in continuous contact with the heated surface until removed by the doctor blade.

In a preferred aspect of the invention, a single roll is arranged for pre-application of a thin slurry layer to the drier surface. By this is meant that as the heated drum surface rotatively advances, it first contacts a driven applicator roll that is positioned partially within the slurry "puddle" provided between the next applicator roll and the periphery of the drum drier. Because of this arrangement the pre-applicator roll picks up a thin layer of slurry and forceably transfers it to the drum drier surface.

Thereafter, as the drying surface continues into contact with the next applicator roll, it bears a pre-coat of cereal slurry. Thereafter, successive layers of slurry are applied over the initial pre-coat. The pre-applicator roll appears to function in much the same manner as a "paint roller" that leaves a continuous layer of paint on the surface being painted.

The objects, features and advantages of this invention will become more apparent when reference is made to the following detailed disclosure, especially in view of the attached drawing, wherein the single figure is a fragmented schematic elevational view depicting portions of a drum drier and a plurality of tangentially arranged applicator rolls.

Referring more specifically to the drawing, the apparatus illustratd comprises conventional internally heated rotatably-driven drum 10 and a series of applicator rolls 11, 12 and 13 spaced around the upper left-hand quadrant defined by the arcuate periphery of drum 10. Rolls 11, 12 and 13 are arranged with their respective axes 11', 12' and 13' generally parallel to axis 10' of drum 10. Drum 10 is further provided with an adjustable doctor blade 15 spaced from the applicator rolls at about the upper right-hand quadrant of the surface of drum 10. Appropriate end plates (not shown) are provided at the respective ends of the drum 10 to overlap the applicator rolls 12 and 13 and provide an enclosed trough for maintaining puddles 16 and 17 of viscous cereal slurry in contact with the respective roll and correspondingly-aligned portion of the surface of drum 10.

In operation, viscous cereal slurry is introduced into each nip formed between the surface of drum 10 and the surface of applicator rolls 12 and 13. As indicated by the directional arrows, drum 10 and applicator rolls 11, 12 and 13 are rotatably driven downwardly into the respective nip. As drum 10 rotates, a portion of the surface thereof passes beneath and adjacent roll 11. Roll 11, driven along with rolls 12 and 13 at a surface speed corresponding to the surface speed of drum 10, is positioned so that a small amount of cereal slurry from puddle 16 adheres to its outer surface. As roll 11 rotates, it applies the slurry to the surface of drum 10 passing therebeneath. As drum 10 continues to revolve the pre-coated surface portion passes through puddle 16 (and the nip) wherein another layer of cereal slurry is applied thereto. After transgressing a short arcuate distance during which some preliminary drying is accomplished, the coated surface of drum 10 next passes through puddle 17 and into the nip formed between the surface of drum 10 and roll 13. In this manner, an additional layer of viscous slurry is forcibly applied onto the existing layers. Drum 10 then transcribes further arcuate revolution during which the drying of cereal sheet 20 is completed. In order to provide a dried sheet of acceptable composition, it is usually necessary to remove substantially all (90–98%) of the water contained therein while the slurry is on the surface of the drum drier. Thereafter, the dried cereal sheet is removed by doctor blade 15 and subjected to further conventional processing such as flaking (not shown).

To control the final thickness of dried cereal sheet 20, it is desirable that applicator rolls 11, 12 and 13 be adjustably positionable with respect to the surface of drum drier 10. Thus, although a spacing of about ⅛ inch has been found to produce a dried sheet having an optimum thickness of 3–7 mils, when an oatmeal slurry is being processed, it will be apparent to one skilled in this art that the applicator rolls may have to be arranged at other spacings when drying different types or concentrations of cereal slurry. Furthermore, additional applicator rolls may be utilized provided of course that they are each arranged with respect to the drum surface in the aforementioned upper quadrant. The diameter of the applicator rolls can also be widely varied. Thus rolls having diameters from 2 to 6 inches and preferably about 4 inches are especially useful with conventional 42″ x 120″ drum driers.

Viscous cereal slurries that are suitable for processing in accordance with the present invention include those formed from any cereal grain flour normally employed in this art and include oat, wheat, rice, corn, barley and the like and mixtures thereof. In addition, high protein combinations as well as fruit-cereals may be processed in the manner of this invention. Of course, it will be apparent to one skilled in this art that other conventional ingredients such as sugar, vegetable oil, milk various acids, and vitamins can be included. Furthermore, miscellaneous enzymes or edible organic emulsifiers can be incorporated to assist in the ultimate release of the dried sheet from the surface of the drier.

The novel, reconstitutable cereal sheet formed by the process of this invention can be formulated by any of the conventional methods well-known to those skilled in this art. For example, the slurry can be prepared by mixing the cereal flour and other ingredients with sufficient water so that the solids content of the resulting slurry will be at least about 20% by weight. More specifically, when an oatmeal cereal slurry is being processed, it is preferable that the slurry be prepared with a total solid content of about 30%, when a rice cereal slurry is being processed it is preferable that the slurry be prepared with a total solid content of about 25%, and when a high protein cereal slurry is being processed, the total solid content is preferably about 20%.

The cereal slurry formulation is then passed through a screen to produce a puree of uniform consistency. Conventional screening devices with openings of about 0.033 inch are frequently employed. Subsequent heating of the slurry to 140–230° F. and preferably 190–205° F. with conventional equipment such as atmospheric, vacuum, pressure-cooking tanks or end-line agitating heaters, produces a gelatinized puree suitable for dehydration.

As previously mentioned, it is preferable that the dehydrated sheet have a sheet thickness of about 4–7 mils. As previously set forth, the film thickness will obviously be dependent upon the space provided between the drum drier and the applicator rolls. In addition, the film thickness can be varied by modifications in drum speed and/or steam pressure within the drum. With respect to the steam pressure, conventional equipment advantageously utilizes steam in the range of 30–90 p.s.i.g. Tension or draw-off rollers may be employed to assist in the removal of the sheet from the drum surface.

The resulting dry cereal sheet can be prepared for packaging and ultimate consumption by flaking into various sizes depending, of course, on the re-hydration characteristics desired. The flaking can be accomplished on standard equipment such as a 10-mesh U.S. sieve series screen (0.030 inch wire).

To further illustrate the novel process of this invention, the following examples are provided. It should be understood that the details thereof are not to be regarded as limitations as they may be varied as will be understood by one skilled in this art.

EXAMPLE I—OATMEAL CEREAL

On oatmeal slurry was prepared in approximately the following proportions.

| Ingredients: | Quantity percent by wt. |
|---|---|
| Oatmeal flour | 60 |
| Granulated white sugar | 20 |
| Skim milk powder | 15 |
| Vitamins, seasoning, acids, etc. | 100 |

Sufficient water was added to reduce the overall solids content to about 30%.

The slurry, having a pH of about 5.0, was pumped through a line strainer having a screen size of 0.06 inch to a holding tank at a temperature of about 160–180° F., from where it was transferred to an agitating heater at about 205° F. The heated slurry was then fed to the troughs formed as illustrated in the drawing between a series of applicator rolls and the surface of a drum drier. The drum drier was operated at internal pressure of 80 p.s.i.g. The drum and applicator rolls were rotated at about 35 feet per minute. The dried sheet was removed with a doctor blade and the resulting cereal sheet conveyed to a flaker employing a No. 5 (U.S. Standard) screen size. The resulting flaked product was found to have a moisture content of about 6%.

EXAMPLE II—VARIATIONS IN CEREAL FLOUR

Example I was repeated, replacing the oatmeal flour with (a) barley and (b) mixed cereal in the same proportions by weight percent. In addition, Example I was repeated replacing the oatmeal flour with rice flour in a solids concentration of about 25%. Again, Example I was repeated utilizing high-protein flour in a solids concentration corresponding to about 20% of the total weight of slurry.

Each of the resulting cereal sheets described in Examples I and II were found to be strong and readily flaked into a desirable particle size for packaging.

Although the foregoing invention has been described in some detail by way of illustration and example for purposes of clarity of understanding, it will be appreciated that certain changes and modifications may be practiced within the spirit of the invention as limited only by the scope of the appended claims.

What is claimed is:

1. A process for dehydrating a pregelatinized cereal grain slurry consisting essentially of 20 to 30% by weight solids, comprising: providing a rotatably driven drum having an arcuate heated periphery surface for drying said slurry; arranging in the direction of drum rotation, respectively first, second and third rotatably driven rolls around about the upper left hand quadrant of the arcuate surface of said drum; introducing sufficient of said slurry between said first and second rotatable rolls and said second and third rotatable rolls and the arcuate surface of said drum to form respective puddles of slurry therebetween; positioning said first rotatably driven roll with its surface partially submerged in the puddle formed between said second roll and said drum; driving said heated drum in a direction so that the surface thereof sequentially advances along said first, second and third rotatably driven rolls; simultaneously driving said rolls at a surface rate and in a direction opposite to the surface rate and direction of advancement of said drum whereby successive layers of slurry are applied to said drum surface by each of said rolls to form a continuous dried sheet of cereal.

2. A process in accordance with claim 1 wherein said dehydrated cereal sheet contains 90–98% solids by total weight.

3. A process in accordance with claim 1 and further characterized by spacing said first, second and third rolls about ⅛ inch from the surface of said drum.

References Cited

UNITED STATES PATENTS

| | | | |
|---|---|---|---|
| 2,621,126 | 12/1952 | Möller | 99—80 |
| 3,418,142 | 12/1968 | Willard | 159—10 |

FOREIGN PATENTS

| | | | |
|---|---|---|---|
| 336,459 | 5/1921 | Germany | 159—11 |

NORMAN YUDKOFF, Primary Examiner

M. G. MULLEN, Assistant Examiner

U.S. Cl. X.R.

99—80; 159—11